Figure 1:
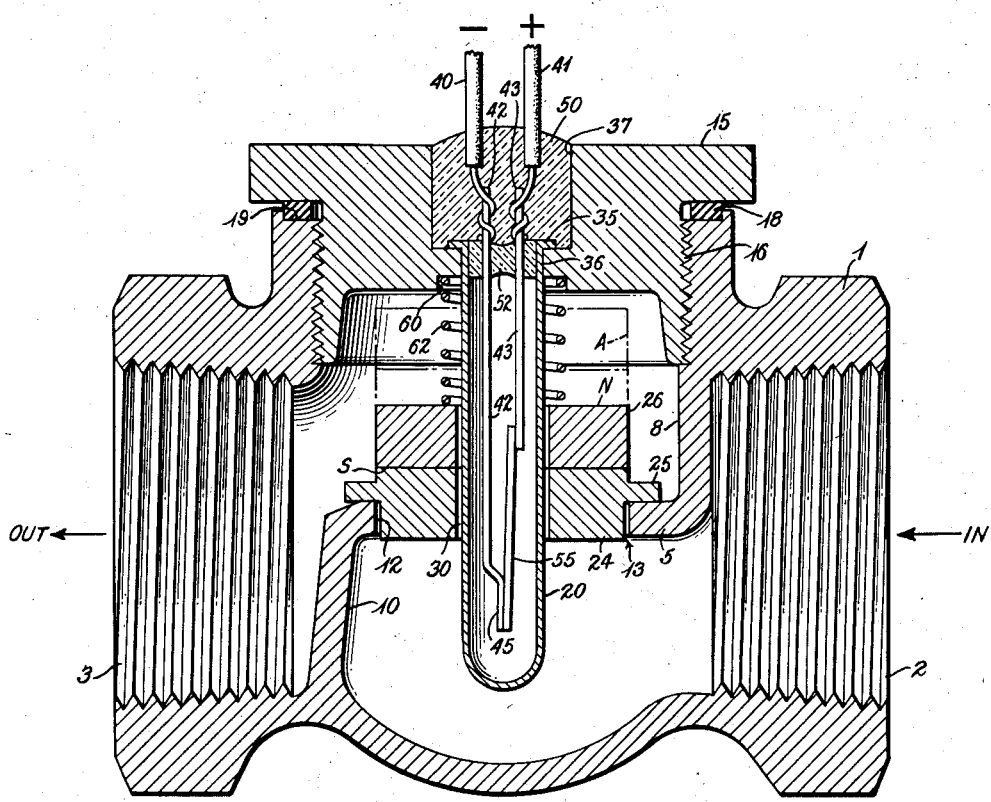

June 23, 1959  E. H. MOORE  2,892,051
FLOW INDICATOR
Filed Feb. 20, 1956

INVENTOR
Edward H. Moore
BY Thomas, Weisman & Russell
ATTORNEYS

United States Patent Office 2,892,051
Patented June 23, 1959

2,892,051

FLOW INDICATOR

Edward H. Moore, Newington, Conn., assignor to The Gems Company, Newington, Conn., a partnership Application February 20, 1956, Serial No. 566,580

1 Claim. (Cl. 200—81.9)

This invention relates to a fluid or gas flow indicator and more particularly to an indicator which is responsive to flow variations to indicate flow, or lack of flow, through a pipe line. The operative principle of the invention resides, in part, in the use of a magnetic field which, dependent upon the position of the field with respect to an enclosed electric switch device, causes the contact points of the latter to open and close, all consequent upon the amount of flow through the unit. Such switch, incorporated in an appropriate electrical circuit, can be used to operate a pilot light, horn or other common type of warning signal. With suitable relays, the switch is also useful in operating preventive interlocks.

Fluid flow indicators in the past have been devised for the purpose of accomplishing certain of the features of this invention. However, many known devices exhibit certain disadvantages, either because they are either inaccurate, too costly for many engineering purposes, or because the mechanism for switch actuation is so cumbersome as to reflect only deviations in flow which are considerable in amount. This is to be contrasted with the inherent utility of the instant invention, a primary feature of which is the ability of the device to indicate increments or decreases in flow of very small amounts. I have provided an instrument which is extremely sensitive, accurate in operation and, hence, is ideal for usage in a wide range of marine and industrial applications.

It is, accordingly, a primary objective of the invention to provide an accurate, yet extremely simple, flow indicating device that, in response to extremely small variations in flow, so alters the position of a magnetic flux as to cause immediate actuation of an appropriate circuit switch. Such magnetic snap action insures an instantaneous and positive make or break.

It is a further objective of the invention to provide a fluid and/or gaseous flow indicator, the operating principle of which revolves about the use of a permanent magnet that is lifted or depressed by even slight fluctuations in flow pressures to create a magnetic flux surrounding the switch and which, dependent upon its position, opens or closes the switch points of the indicating circuit. Regarding this aspect of the invention, there is also an additional advantage in that, by the peculiar arrangement of parts here employed, although the switch is immediately adjacent to and surrounded by the magnetic influence, it is out of direct contact with any corrosive or other deteriorating substance.

A further object of the invention is the provision of an instrument of the described type which is compact and represents the essence of simplicity when it comes to installation; the unit is designed for use with conventional or ordinary pipe fittings and, therefore, does not require a special housing or prefabricated castings to adapt it for use in different types of fluid flow systems.

An additional object of the invention is that the unit, having no moving linkages or flexing parts, is so designed as to be substantially vibration proof and resistant to abnormal weather or pressure conditions which would otherwise have a decided effect upon its operation. Furthermore, since the switch itself is hermetically sealed in glass, the unit is explosion proof and, as stated, corrosion resistant.

The invention is primarily adapted for use in the aircraft industry; however, a further aim of the invention is a unit which enables accurate determinations of pressure changes in various kinds of systems, such as cooling systems, air flow and gas systems and, as well, complicated electronic systems where even slight variations in pressure must be instantly and accurately reflected for preservation of the equipment. For example, incorporated in the cooling line of a boat, the indicator comprising this invention immediately signals stoppages such as those frequently caused by clogged strainers. Remedial action can then be taken before overheating occurs and the engine is damaged. Equipped with a delay, the flow indicator can be used in analogous industrial applications where it can be employed to shut down a motor, or motors, immediately and automatically when flow ceases.

Finally, it is another objective of the invention to provide an indicating unit which has an extremely low pressure drop thereby making it adaptable to most existing fluid or gas systems. In this aspect, the instant unit reflects variations of the slightest degree and thus efficiently operates in systems with a fluid flow of less than .5 gallon per minute. Because of its unique design, the instrument can be fabricated to reflect and accurately indicate fluid variations where the fluid flow is of even lesser amounts and to provide other higher or lower function points than the one specifically cited.

Figure 2:
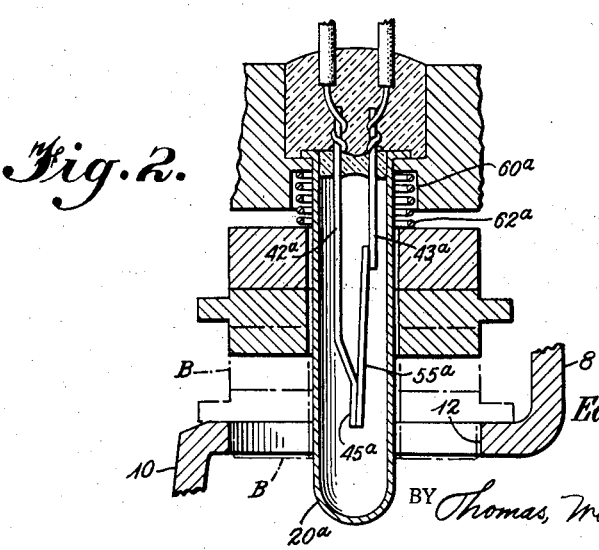

Other advantages and objectives of the invention will be apparent from consideration of the following description of the invention which is made with reference to the accompanying drawings and wherein:

Figure 1 is a vertical section view of the invention in cross section showing the general arrangement of the several parts thereof, and Figure 2 is a partial view, taken in section, of a modification of my invention.

The drawings represent a preferred embodiment of the invention and it is here shown as applied to an ordinary type of pipe fitting which, in the instant case, is actually a valve casing. Here, the unit is merely inserted into the top portion of this casing by the usual means in a manner which can be readily understood by reference to the following.

Referring particularly to Figure 1, it is seen that the casing 1, having an upwardly extending housing 3, is provided with the usual inlet and outlet orifices. Both of such orifices are tapped with threads for obvious purposes. And, as is customary in fittings of this type, the casing is also provided with a horizontal partition or wall 5 which would normally form a valve seat. Such partition is supported from the top of the fitting by an interior, vertically disposed flange 8 and from the bottom, as here shown, by a slightly inclined flange 10. A fluid passageway or orifice 12 is provided in the partition 5.

The top closure or cap 15 to this valve structure is threaded as at 16 and adapted for threaded engagement with the main body portion 1 of the casing. As is usual, a sealing gasket 18 is placed in between the peripheral flange of the cap 15 and a groove 19 scribed into the upwardly extending collar 3, the latter forming an integral portion of casing 1.

The circuit-making and breaking switch, suitably and electrically interconnected with an indicator of any common form, is positioned within a capsule or tubular container 20 which is made of any known non-magnetic material such as glass, porcelain, synthetic resin, etc. This capsule 20, when suspended within the interior of the casing 1 in a manner to be described, actually and in addition to its functions as a housing for the switch, performs the additional function of being a guide-way or slidable support for both the shuttle 24 and the permanent magnet 26, the latter resting upon the shuttle and moving up or down therewith. Both shuttle and magnet are preferably circular in configuration, the main body portions being of the same, or approximately the same, diameter.

Both the shuttle and the permanent magnet are also apertured as indicated at 30 to receive the casing or capsule 20, the latter extending through and substantially beyond the passageway 12 and into the lower portion of the globe housing 1. The lower portion of the shuttle 24 rests within the aperture 12 formed within the horizontal partition 5, the tolerance being sufficient to permit free reciprocating movement therein.

The reciprocating member or shuttle 24 is also provided with a flange 25 extending around its periphery and adapted to be positioned over the opening 12 as a closure when pressure in the system is insufficient to raise it above the position shown in Figure 1, or, in other words, to open the inlet passageway to the outlet passageway. The capsule 20 is flanged at its top as at 35 in order that it may fit within an appropriate opening 36 within the top 15. The flange 35 rests upon the base of an additional bore 37, also formed in the screw top 15.

The positive and negative leads, so indicated upon the drawing, are connected to an appropriate electrical system, the latter comprising a circuit to an indicator, such as a sound or light indicator. These leads, 40 and 41, respectively, are preferably imbedded in a porcelain or so-called potting composition 50 that completely fills the bore 37 and, hence, maintains the interconnection between such leads and the leads to the contact points of the switch itself in a tight and sealed relationship. As here shown, these wires at their terminal ends are wound about the two switch members 42 and 43 and may be additionally secured thereto by any usual media such as brazing or soldering.

The switch elements 42 and 43 extend downwardly into the capsule and are further secured at their upper ends to the side walls of the capsule by a hermetic seal of any suitable type. Preferably, prior to or during the assembly of the switch unit, the interior of chamber 20 is filled with an inert gas to facilitate the operation of the switch therein, largely by reducing the tendency to arc or the tendency to corrode as would be the case if, e.g., moisture laden air filled the interior of the capsule.

The switch element 42 extends further down than the other switch element 43 and terminates in an extension 45 which is parallel to the main body 42 of this element. The elements 42 and 45 are made of a non-magnetic yet spring-like material such as bronze, aluminum, or other suitable alloy. Such spring loaded element 42 is shown in flexed position or in a position causing contact or closure of the two switch points. In its unflexed position, the element 42 is so set that the switch points are separated, to be closed only by the influence of the magnetic flux created about the switch points when the magnet 26 is in the position indicated in solid lines in Figure 1 of the drawing.

The terminal end of the element 43 provides one of the points of contact of the switch as shown in this same figure. Element 43 is fabricated of soft iron or other non-permanent magnetic material. Because closure is accomplished by magnetic attraction between the points and since members 42 and 45 are of non-magnetic material, another switch point 55 is affixed by any suitable method to the described extension 45 of switch element 42. This switch point 55 is also of soft iron or of an alloy that will readily respond to the magnetic influence of the magnet 26. The two terminal ends of these elements 43 and 55 are overlapping, in the manner shown, and at their overlapping positions may be suitably plated to improve contact performance.

As should be readily understood, the shuttle will be moved from the position shown in the solid line in Figure 1 of the drawings to the position A indicated in dotted line by pressure of fluid or gas flowing from inlet to outlet of the unit and thus pressing upwardly against the shuttle through passageway 12. As shown in solid lines in this figure, the switch is closed since the magnetic field surrounding the switch points is approximately opposite these points. This magnet, normally an Indox magnet or similar permanent magnet of comparably strong magnetic influence, is of the type wherein the field is created by opposite polarities on opposite sides of the two lateral faces thereof and in approximately axial alignment with the switch housing 20. In other words, assuming the north pole of the magnet to be N and the south pole to be at the underside of the magnet or as indicated at S, the magnetic flux is created and directly imparted to that adjacent switch element, the greater portion of which is adjacent the respective polarity. Thus, switch element 43, at its lower terminal end, is predominantly within the influence of the north pole of the Indox magnet, whereas contact point 55 is largely within the magnetic influence of the south pole S of the magnet. Hence, contact points 43 and 55 will assume an induced magnetism of positive and negative polarities, respectively, the consequent mutual attraction of these two elements causing them to contact and close the circuit.

Still referring to Figure 1, it is to be appreciated that upon a pressure flow of sufficient force, the shuttle 24 is caused to rise to position A. In this position, it will be appreciated that the Indox magnet 26 is appreciably above both contact points and, hence, in no position to cause any fluctuation or contacting thereof. At this phase of operation, the switch is necessarily open and the circuit to the indicator broken, it being understood that with the inherent springiness of the other element 42, and in the absence of any appreciable magnetic field, the element 42 will be caused to spring back, thereby separating the switch points.

It is to be further understood that the device may be operated on the gravity principle alone. In other words, the shuttle 24 and the magnet 26, together with the other elements, can be so proportioned and fitted, within the skill of the art, that gravity alone forces closure of the opening 12. In this type of unit, the force of flow would have to be only that sufficient to slide the shuttle upwardly upon its central support which, in this instance, is the capsule or container 20. In this modified version of the invention, however, the unit would necessarily have to be positioned in the horizontal manner shown, or approximately so, to permit the shuttle to drop by gravity.

In the preferred embodiment of the invention and as illustrated in the drawings, I have utilized a helical spring 62 which is fitted within a partial bore 60 in the underneath side of the cap or top portion 15. Such a spring, of predetermined thrust, presses against the bottom wall of the said bore 60 at one end and exerts thrust against the Indox magnet 26 as shown in the drawings. Here, the force of flow would have to be sufficient to retract the spring 62 to a point where the magnet and shuttle assume the position or approximate position indicated at A in dotted line. The advantage of this modification of the invention resides in the fact that, with such spring exerting constant thrust upon the shuttle, the gravity factor for closure of the fluid passageway is largely eliminated, and the indicator unit can then be mounted in any position at all, and at any angularity to the vertical or horizontal.

I have also provided an alternative modification to the basic unit described with respect to Figure 1 in the foregoing. In this alternate construction, the circuit is normally open during periods of lack of flow through the unit, and the circuit closes and remains closed during flow conditions. Such an alternate embodiment of the invention is useful in certain applications thereof, as, for example, where cooling fluids are used in electronic equipment. In such instances, it is often desirable to have a closed circuit whenever there is circulation and one that will open, shutting off the equipment, in the event the flow ceases. Furthermore, there may be instances where it is desirable that the indication of no-flow is demonstrated to the operator by the turning off of a constant signal such as a green light. This alternate construction is illustrated in Figure 2, wherein it is seen that the magnet in its lifted position, or in the flow position, causes closure of the contact points. Conversely, in the no-flow condition, both shuttle and magnet are permitted to drop to the position B indicated in dotted line, thus breaking the circuit. The related elements illustrated in Figure 2 are practically the same as those shown in Figure 1 except that the point of contact of the two overlapping contact members is higher than their respective positions as shown in Figure 1. Accordingly, the same non-magnetic member 42a is here shown as provided with a similar extension 45a and this, in turn, affixed to a magnetizable or soft iron element 55a. The latter, as is apparent, is adapted to contact its counterpart, also magnetizable, illustrated at 43a. In other words, the two elements 42a and 43a have been shortened, as here shown, so that the contact points are higher, hence lending the unit to the operation described—an open circuit in the no-flow condition and a closed circuit under flow conditions. The spring 62a is used for the purpose set forth with respect to the invention as described by reference to Figure 1, although here the partial bore 60a may be of greater depth in order to accommodate the necessary convolutions of the spring 62a. Since the length of the casing 20a is, in part, dependent upon the length of the elements 42a and 43a, such casing, as shown in Figure 2, is also shorter than the capsule illustrated at 20 in Figure 1. It is, of course, to be understood that the modification of Figure 2 is subject to the same variance: it may be so designed as to operate upon the gravity principle, or, by use of the spring 62a, is adaptable for usages where it is operable despite location of the unit at different angles to the horizontal. This latter function, where the helical spring is employed, has been referred to in the foregoing.

From the foregoing description, the operation of this invention should be readily apparent. The flow indicator can be set for predetermined speeds of flow of fluid or gas under pressure to suit any given industrial application. Referring to the modification of Figure 1, when this is done and the unit installed in a given fluid line, so long as the flow through the globe type housing is maintained at such predetermined constant, the shuttle, carrying the magnet above it, will assume the position indicated by the dotted line A. As heretofore explained, the magnet is then in a position to be moved where its magnetic field fails to influence the two contact points. Hence, due to the inherent spring of the element 42, the contact points are retained in an open position and the circuit to the warning signal is broken. However, if there be even a relatively slight deviation from the predetermined flow that is calculated to be necessary for operative purposes, then the spring 62, or, in the case of a gravity operated device, the force of gravity will force the shuttle and, of course, the magnet back into the position shown in solid lines in the drawing. In this position, the magnetic influence of the magnet will be sufficient to cause the contacts to close by a trigger-like snap action. The warning signal is thus consequently actuated to attract the attention of the operator.

The operation of the variance of Figure 2 has been described above. Here, and as stated, a reverse procedure ensues—in sum, during flow conditions of predetermined amounts, the circuit remains closed; no-flow periods result in opening of the circuit.

Although of relative simplicity in its arrangement of parts and related elements, the indicator of this invention is most durable and highly accurate in determining and automatically signaling any variation in current flow. Being adaptable to almost every industrial field, the flow indicator of this invention is nevertheless a relatively low cost item and can be readily and economically fabricated on a mass production basis.

I claim:

In a flow-responsive indicator unit, a globe housing having a top closure and provided with a fluid inlet and outlet and an interconnecting passageway therebetween, said passageway being positioned at right angles to said inlet and outlet, an hermetic, elongated switch casing mounted medially through said passageway and between said inlet and outlet, said switch casing being affixed to and extending from said top closure, a fluid pressure responsive shuttle in said passageway and positioned to close said passageway, said shuttle being apertured to receive said casing in slidable relationship, a spring means to normally force said shuttle over said passageway in closed relationship, said spring means permitting said shuttle to rise toward said top closure upon flow of fluid at a predetermined pressure through said passageway, a permanent magnet surrounding said switch casing and supported upon said shuttle to reciprocate therewith, said casing providing a guide means for said shuttle and said magnet during reciprocal movement thereof, said magnet having opposed polarities positioned in approximate axial alignment with said switch casing, a circuit connected switch in said casing having overlapping switch points of non-permanent magnetizable material, said switch points being normally spring-biased to open position, said magnet surrounding said switch points during periods of said closed relationship of said shuttle, whereby, during normal fluid flow, said magnet is forced away from said switch points permitting said points to open by spring action, and during abnormal, lower pressures of fluid flow said magnet causes said points to close by magnetic attraction.

References Cited in the file of this patent

UNITED STATES PATENTS

| | | |
|---|---|---|
| 970,951 | Reubold | Sept. 20, 1910 |
| 1,010,620 | Crumpton | Dec. 5, 1911 |
| 1,404,328 | Stearns | Jan. 24, 1922 |
| 1,962,795 | Walker | June 12, 1934 |
| 2,166,264 | Piper | July 18, 1939 |
| 2,378,986 | Dickten | June 26, 1945 |
| 2,400,479 | Binford | May 21, 1946 |
| 2,524,261 | Kaminky | Oct. 3, 1950 |
| 2,719,485 | Bendar | Oct. 4, 1955 |
| 2,783,326 | Hanson et al. | Feb. 26, 1957 |

FOREIGN PATENTS

| | | |
|---|---|---|
| 669,932 | Great Britain | Apr. 9, 1952 |